United States Patent
Klar et al.

(10) Patent No.: US 10,907,725 B2
(45) Date of Patent: Feb. 2, 2021

(54) WET-RUNNING FLEXIBLE DRIVE

(71) Applicant: Magna Powertrain GmbH & Co KG, Lannach (AT)

(72) Inventors: Alexander Klar, Graz (AT); Wolfgang Schweiger, St. Stefan (AT); Helmut Martin Waser, Graz (AT)

(73) Assignee: MAGNA POWERTRAIN GMBH & CO KG, Lannach (AT)

( * ) Notice: Subject to any disclaimer, the term of this patent is extended or adjusted under 35 U.S.C. 154(b) by 193 days.

(21) Appl. No.: 16/083,927

(22) PCT Filed: Feb. 7, 2017

(86) PCT No.: PCT/EP2017/052599
§ 371 (c)(1),
(2) Date: Sep. 11, 2018

(87) PCT Pub. No.: WO2017/157581
PCT Pub. Date: Sep. 21, 2017

(65) Prior Publication Data
US 2019/0072175 A1   Mar. 7, 2019

(30) Foreign Application Priority Data

Mar. 18, 2016 (DE) .................. 10 2016 204 519

(51) Int. Cl.
*F16H 57/04* (2010.01)
*F16H 57/05* (2006.01)
(Continued)

(52) U.S. Cl.
CPC ........... *F16H 57/0424* (2013.01); *F16H 7/06* (2013.01); *F16H 7/18* (2013.01); *F16H 57/0423* (2013.01);
(Continued)

(58) Field of Classification Search
CPC ............... F16H 7/18; F16H 2007/185; F16H 2007/0872; F16H 7/06; F16H 57/042;
(Continued)

(56) References Cited

U.S. PATENT DOCUMENTS 2,601,789 A * 7/1952 Riopelle ................... F16H 7/18
474/140
2,766,634 A * 10/1956 Frank ....................... F16F 7/00
474/140

(Continued)

OTHER PUBLICATIONS

International Search Report and Written Opinion dated Apr. 6, 2017 from corresponding International Patent Application No. PCT/EP2017/052599 with English translation of International Search Report.

*Primary Examiner* — Michael R Mansen
*Assistant Examiner* — Raveen J Dias
(74) *Attorney, Agent, or Firm* — Dickinson Wright PLLC

(57) ABSTRACT

Wet-running flexible drive mechanism (1) for the transmission of torque having a drive element (2, 2') and an output element (3, 3'), the drive element (2, 2') and the output element (3, 3') being drive-connected to one another via a flexible drive (14), the flexible drive (14) being arranged partially in a lubricant sump (4), characterized in that at least one guiding element (5) is arranged in the region of the lubricant sump (4), the guiding element (5) being shaped in such a way that a constriction (6) in the form of a gap which tapers in a wedge-shaped manner is formed between the flexible drive (14) which is arranged partially in the lubricant sump (4) and the guiding element (5).

11 Claims, 4 Drawing Sheets

Figure 1:
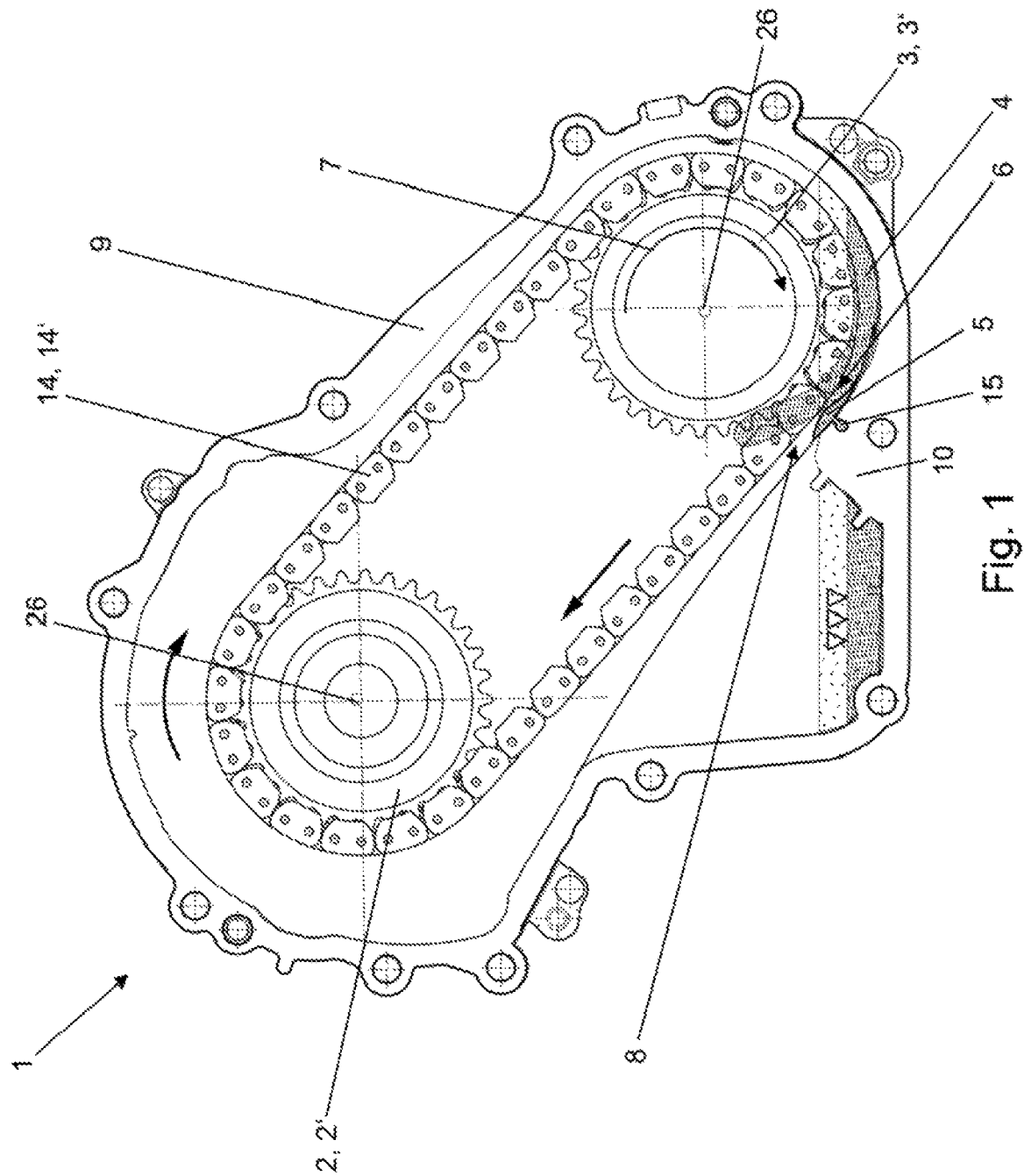

(51) Int. Cl.
*F16H 7/06* (2006.01)
*F16H 7/18* (2006.01)
*F16H 7/08* (2006.01)

(52) U.S. Cl.
CPC ..... *F16H 57/0457* (2013.01); *F16H 57/0486* (2013.01); *F16H 57/05* (2013.01); *F16H 2007/0872* (2013.01); *F16H 2007/185* (2013.01)

(58) Field of Classification Search
CPC ............ F16H 57/0421; F16H 57/0423; F16H 57/0424; F16H 57/0457; B60K 17/344
See application file for complete search history.

(56) References Cited

U.S. PATENT DOCUMENTS

| | | | | |
|---|---|---|---|---|
| 5,273,136 | A * | 12/1993 | Martin | F16H 57/0421 |
| | | | | 184/6.12 |
| 9,079,720 | B1 | 7/2015 | Schmidt | |
| 9,759,294 | B2 * | 9/2017 | Lee | F16H 7/18 |
| 2002/0042316 | A1 * | 4/2002 | Young, Jr. | F16H 7/18 |
| | | | | 474/140 |
| 2004/0067806 | A1 * | 4/2004 | Markley | F16H 7/0848 |
| | | | | 474/110 |
| 2015/0323059 | A1 | 11/2015 | Pritchard | |
| 2015/0337947 | A1 * | 11/2015 | Steward | F16H 57/0457 |
| | | | | 475/83 |
| 2017/0108111 | A1 * | 4/2017 | Steward | F16H 57/0457 |
| 2018/0163848 | A1 * | 6/2018 | Quinn | F16H 7/18 |

\* cited by examiner

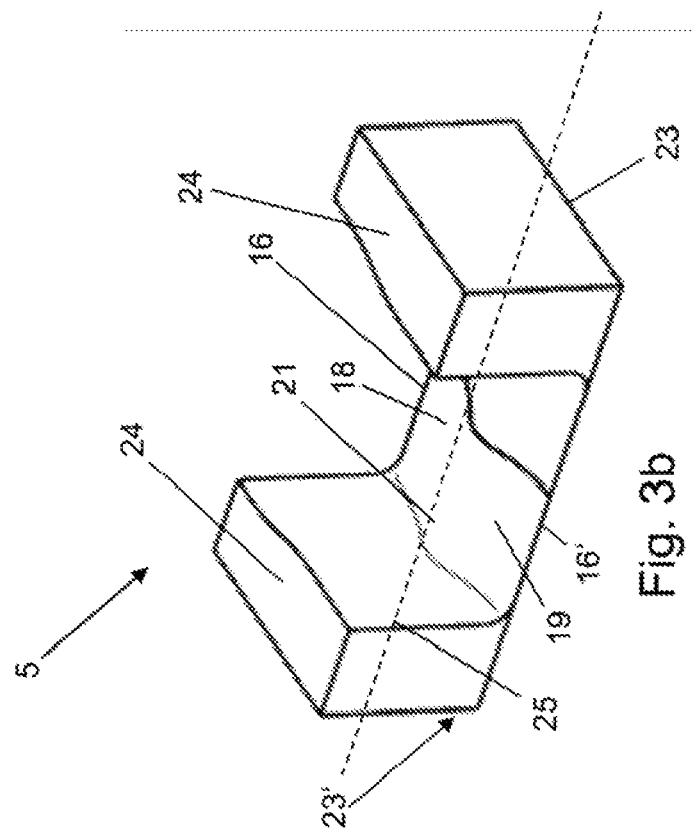
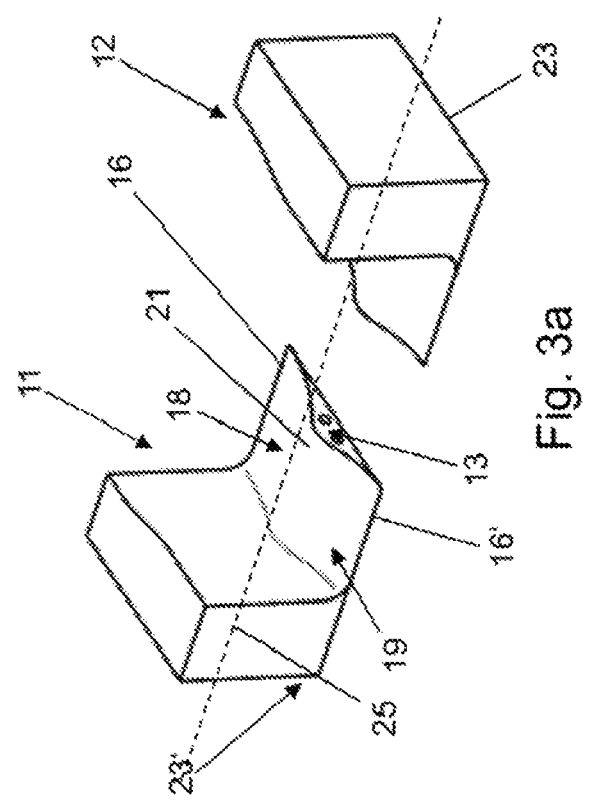

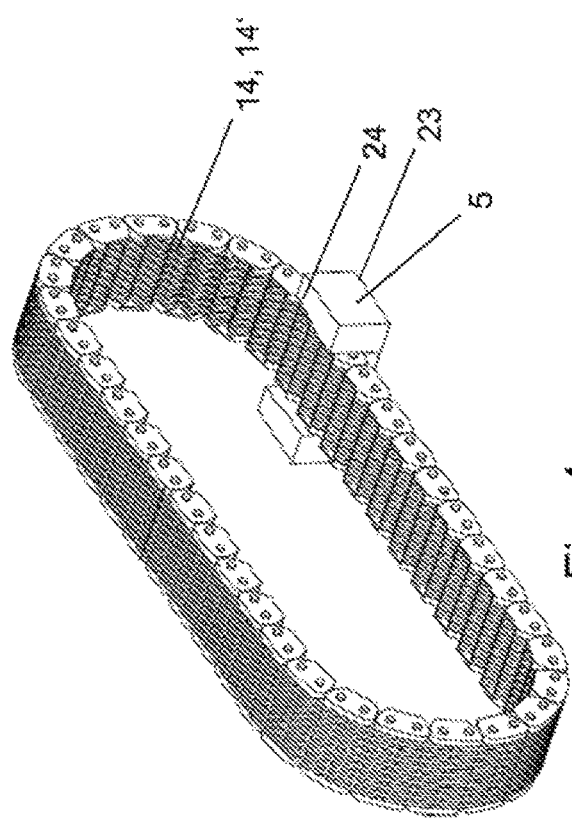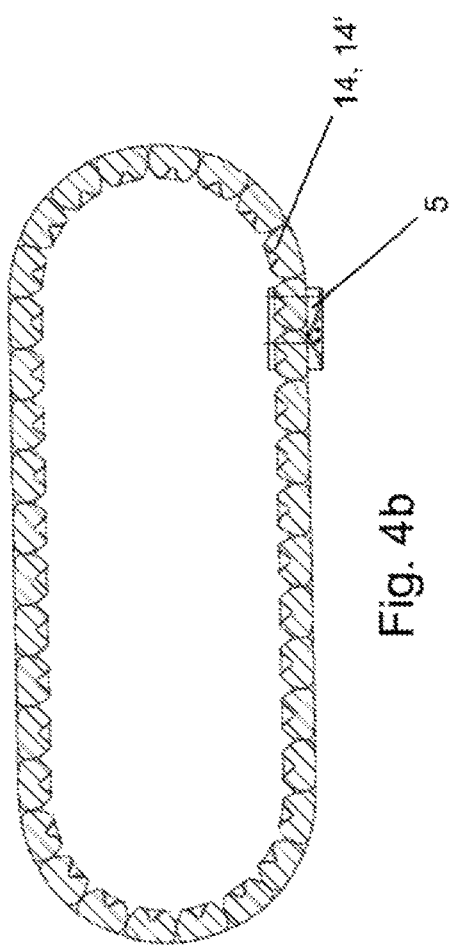

WET-RUNNING FLEXIBLE DRIVE

CROSS-REFERENCE TO RELATED APPLICATIONS

This application is a National Stage of International Patent Application No. PCT/EP2017/052599, filed Feb. 7, 2017, which claims the benefit and priority of German Patent Application No. DE 10 2016 204 519.9 filed Mar. 18, 2016. The entire disclosures of each of the above applications are incorporated herein by reference.

TECHNICAL FIELD

The present invention relates to a wet-running flexible drive mechanism for the transmission of torque having a drive element and an output element, the drive element and the output element being drive-connected to one another via a flexible drive, the flexible drive being arranged partially in a lubricant sump, characterized in that at least one guiding element is arranged in the region of the lubricant sump, the guiding element being shaped in such a way that a constriction in the form of a gap which tapers in a wedge-shaped manner is formed between the flexible drive which is arranged partially in the lubricant sump and the guiding element.

BACKGROUND

A very wide variety of mechanism arrangements, in particular, however, non-positive and/or positively locking mechanism arrangements, are used in drive trains for motor vehicles of all types. Mechanism arrangements of this type as a rule require mechanism lubrication and/or mechanism cooling, in order for it to be possible to ensure reliable operation which is optimized in terms of the service life.

As a further consequence, the term "lubrication" is also to be understood to mean measures for heat dissipation, that is to say for cooling parts of a mechanism arrangement.

Different lubricating methods can be applied for mechanism lubrication, immersion lubrication and lubricant circulation lubrication or spray lubrication in particular representing known methods. In the case of immersion lubrication, the lubricant is transported by way of rotating parts of the mechanism arrangement to collecting containers and/or lubricating points. In the case of the lubricant circulation lubrication or spray lubrication, lubricant is conveyed by means of a lubricant pump via collecting containers and/or lubricant lines to the lubricating points.

In the case of the immersion lubrication, parts or at least one part of the mechanism arrangement as a rule rotates/rotates at least partially in a lubricant sump which is filled with lubricant, as a result of which splash losses or drag losses are to be expected and the degree of efficiency of the mechanism arrangement is decreased.

Wet-running positively locking flexible drive mechanisms can transport at least part of the lubricant requirement which is required at the individual lubricating points to a higher geodetic level in comparison with the lubricant sump with a corresponding design of the lubricant sump and the housing wall and any additional guiding devices, and can thus fill, for example, an oil collecting container which is integrated into the mechanism housing with lubricant. This takes place by way of at least partial dipping of the circulating flexible drive into the lubricant sump and therefore generally causes undesired drag losses which are greatly dependent on the temperature and on the rotational speed of the rotating components. From the oil collecting container, the individual lubricating points, such as anti-friction and plain bearings, running toothing systems or wet-running friction clutches, can be supplied with lubricant by way of lubricating oil bores which are arranged in a defined manner. An additional lubricant pump can therefore be dispensed with in many applications. In addition, the oil supply of the different lubricating points from the oil collecting container can take place as needed, for example in a manner which is dependent on the switching position of an actuator unit for actuating a friction clutch.

SUMMARY

It is an object of the invention to improve a wet-running flexible drive mechanism for the transmission of torque, in such a way that a reduction of drag losses and therefore reliable operation of the mechanism arrangement which is optimized in terms of the degree of efficiency can be ensured in a simple way.

The object is achieved by way of a wet-running flexible drive mechanism for the transmission of torque having a drive element and an output element, the drive element and the output element being drive-connected to one another via a flexible drive, the flexible drive being arranged partially in a lubricant sump, characterized in that at least one guiding element is arranged in the region of the lubricant sump, the guiding element being shaped in such a way that a constriction in the form of a gap which tapers in a wedge-shaped manner is formed between the flexible drive which is arranged partially in the lubricant sump and the guiding element.

The wet-running flexible drive mechanism according to the invention has a drive element and an output element. The drive element and the output element are drive-connected to one another.

The drive connection of the drive element to the output element takes place via a flexible drive, such as a chain or a belt.

According to the invention, the flexible drive is arranged partially in a lubricant sump, with the result that the flexible drive splashes in the lubricant sump and, upon rotation, conveys lubricant out of the lubricant sump.

In accordance with the present invention, at least one guiding element is arranged in the region of the lubricant sump. According to the invention, the guiding element is configured in such a way that a constriction in the form of a gap which tapers in a wedge-shaped manner is formed between the flexible drive which is arranged partially in the lubricant sump and the guiding element.

The constriction is therefore to be understood as a gap which tapers in a wedge-shaped manner in relation to a rotational direction of the drive element and/or output element between the guiding element and the flexible drive of the wet-running flexible drive mechanism.

On account of the wedge-shaped gap which is defined via the geometry of the guiding element, that is to say a point with a reduced clearance between the flexible drive which is arranged partially in the lubricant sump and the guiding element, a hydrodynamic pressure is generated in the region of the constriction; at the transition from a greater to a smaller cross section, the flow velocity and therefore the hydrodynamic pressure increase, which leads to lubricant flowing or spraying to an increased extent in this region around the flexible drive which is arranged partially in the lubricant sump. As a result, the lubricant level in the lubricant sump can be reduced, and a reduction of drag losses and therefore reliable operation of the wet-running flexible drive mechanism which is optimized in terms of the degree of efficiency can be ensured in this way.

The flexible drive which circulates at a locally narrow spacing from the guiding element brings about a drag flow and a conveying action in a tangentially inward manner, in the direction of a rotational axis of the drive element and/or output element. As a result, the flexible drive is supplied sufficiently with lubricant. Drag losses can be kept low by way of the flexible drive running into the lubricant merely locally.

The wet-running flexible drive mechanism preferably comprises a housing, the lubricant sump being configured in an integrated manner in the housing of the wet-running flexible drive mechanism.

A construction of the wet-running flexible drive mechanism according to the invention, which construction is optimized in terms of components and costs, is thus realized.

It is advantageous if the housing has a geometric bulge in the region of the lubricant sump, the guiding element preferably being arranged on the bulge of the housing.

The guiding element preferably has a first part and a second part, the first part and the second part being configured such that they can be joined along a dividing plane to form the guiding element.

By way of the two-piece configuration of the guiding element, the installation of the guiding element in the case of reduced installation space is facilitated and production costs are lowered.

In one alternative embodiment of the present invention, the bulge and the guiding element are configured in one piece.

By way of the one-piece configuration of the bulge and the guiding element, a simple construction of the wet-running flexible drive mechanism according to the invention, which construction has a reduced number of components, can be realized.

In comparison with a delivery of lubricant by way of a lubricant pump, the wet-running flexible drive mechanism according to the invention discloses a variant of the lubricant delivery in a wet-running flexible drive mechanism, which variant is reduced in terms of the number of components and in terms of the costs. Furthermore, pump noise is dispensed with, and reliable operation of the wet-running flexible drive mechanism can be ensured.

DRAWINGS

Figure 2B:
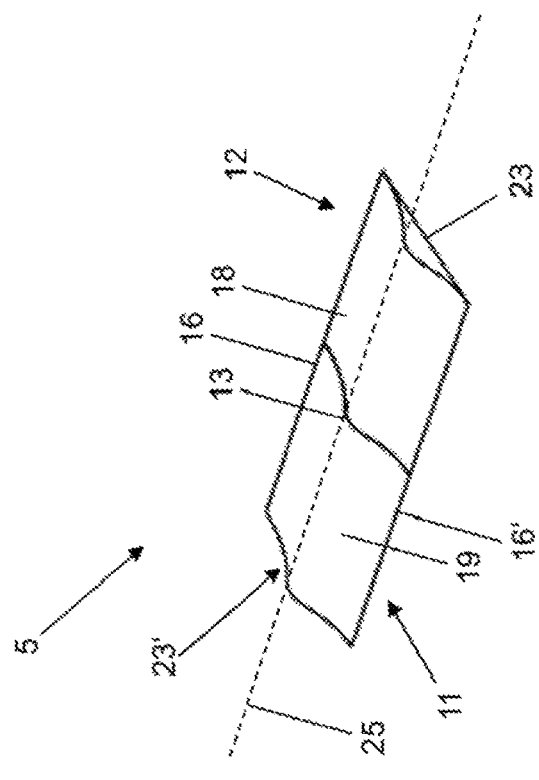
Figure 2A:
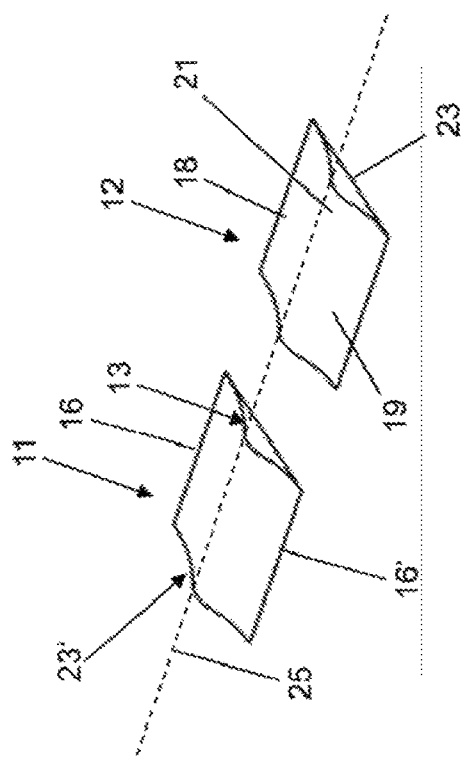
Figure 2C:
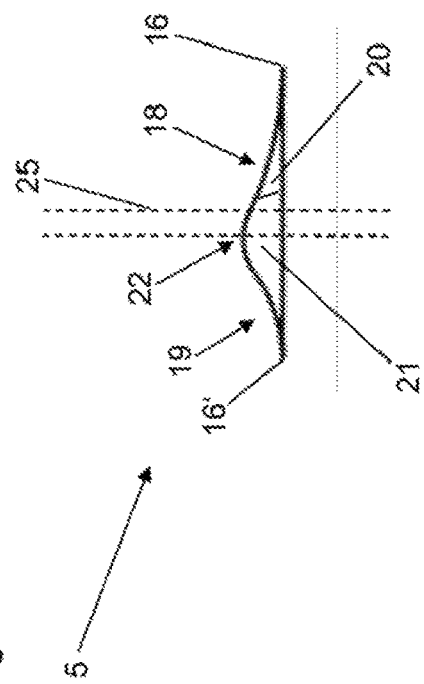

The invention will be described in the following text by way of example with reference to the drawings, in which:

FIG. 1 shows a sectional view of an exemplary wet-running flexible drive mechanism according to the invention, FIG. 2a shows a perspective view of one exemplary embodiment of a guiding element, FIG. 2b shows a further perspective view of one exemplary embodiment of a guiding element in accordance with FIG. 2a, FIG. 2c shows a cross section through a guiding element in accordance with FIG. 2a and FIG. 2b, FIG. 3a shows a perspective view of a further exemplary embodiment of a guiding element, FIG. 3b shows a further perspective view of one exemplary embodiment of a guiding element in accordance with FIG. 3a, FIG. 4a shows a perspective detailed view of a flexible drive and a guiding element in accordance with FIG. 3a and FIG. 3b, and FIG. 4b shows a sectional view of the illustration in FIG. 4a.

DESCRIPTION

FIG. 1 shows an exemplary wet-running flexible drive mechanism 1 in accordance with the present invention.

The wet-running flexible drive mechanism 1 has a drive element 2 in the form of a drive gearwheel 2' and an output element 3 in the form of an output gearwheel 3'. The drive gearwheel 2' and the output gearwheel 3' are arranged in a substantially axially parallel manner to one another and are drive-connected via a flexible drive 14 (here, a chain 14').

Furthermore, the wet-running flexible drive mechanism 1 has a housing 9. A lubricant sump 4 is configured in an integrated manner in the housing 9.

The output gearwheel 3' is arranged partially in the lubricant sump 4. The chain 14' dips into the lubricant sump 4 in the region of the output gearwheel 3'.

The housing 9 has a rib-shaped bulge 10 in the region of the lubricant sump 4 where the chain 14' runs out of the lubricant sump 4. A guiding element 5 is arranged on the bulge 10. In the present exemplary embodiment in accordance with FIG. 1, the guiding element 5 is fastened to the bulge 10 of the housing 9 of the wet-running flexible drive mechanism 1 by means of a connecting element 15 which can be joined in a positively locking manner to the housing 9 in the region of the bulge 10. The fastening of the guiding element 5 to the housing 9 and/or the bulge 10 of the housing 9 of the wet-running flexible drive mechanism 1 can also be realized, however, by means of any technically customary connecting type, such as pressing in, adhesive bonding, screwing, etc. A single-piece configuration of the guiding element 5 with the housing 9 and/or the bulge 10 of the housing 9 of the wet-running flexible drive mechanism 1 is likewise conceivable.

In relation to the rotational direction 7 of the output gearwheel 3' which is arranged partially in the lubricant and/or coolant sump 4, the guiding element 5 is arranged in the lubricant sump 4 on the exit side 8 of the output gearwheel 3 from the lubricant sump 4.

FIG. 2a, FIG. 2b and FIG. 2c show one exemplary design variant of the guiding element 5 of the wet-running flexible drive mechanism 1 according to the invention. FIG. 3a and FIG. 3b show a further exemplary design variant of the guiding element 5 of the wet-running flexible drive mechanism 1 according to the invention.

The guiding element 5 which is shown in FIG. 2a, FIG. 2b and FIG. 2c and the guiding element 5 which is shown in FIG. 3a and FIG. 3b are configured in two pieces; the guiding element 5 comprises a first part 11 and a second part 12. The first part 11 and the second part 12 can be joined along a dividing plane 13 to form the guiding element 5, for example by means of a plug-in connection, an adhesively bonded connection, etc.

A single-piece configuration of the guiding element 5 is not ruled out, however, by the design variants which are shown in FIG. 2a, FIG. 2b, FIG. 2c and FIG. 3a, FIG. 3b.

The guiding element 5 which is shown in FIG. 2a and FIG. 2b and in FIG. 3a and FIG. 3b has a geometry 21 of wedge-shaped configuration in relation to a longitudinal axis 25 of the guiding element 5, in order to achieve a gap which tapers in the rotational direction. This results in a first section 18 of the guiding element 5 and a second section 19 of the guiding element 5, the first section 18 of the guiding element 5, starting from the highest point 22 of the geometry 21 of wedge-shaped configuration, running at a more acute angle 20 in the direction of the one longitudinal side 16 of the guiding element 5, on account of the eccentricity of the geometry 21 of wedge-shaped configuration, than the second section of the guiding element 5, starting from the highest point 22 of the geometry 21 of wedge-shaped configuration, in the direction of the other longitudinal side 16' of the guiding element 5 (FIG. 2*c*).

The configuration of the constriction 6, that is to say of the gap which tapers in a wedge-shaped manner, between the guiding element 5 and the flexible drive 14 is defined by way of the configuration of the first section 18 of the guiding element 5.

The guiding element 5 which is shown in FIG. 3*a* and FIG. 3*b* is of substantially identical configuration to the guiding element 5 which is shown in FIG. 2*a*, FIG. 2*b* and FIG. 2*c*, but, on the two transverse sides 23, 23' of the guiding element 5, in each case has a side wall 24 which runs along the respective transverse side 23, 23'.

FIG. 4*a* and FIG. 4*b* show the guiding element 5 which is shown in FIG. 3*a* and FIG. 3*b* when assembled with a chain 14'.

In the present exemplary embodiment, lubricant flows to an increased extent around the chain 14' as a result of the configuration of the wet-running flexible drive mechanism 1 and, in particular, as a result of the configuration of the constriction 6 between the guiding element 5 and the flexible drive 14 (here, the chain 14'). As a result, the nominal filling level can be lowered in relation to a rotational axis 26 of the output gearwheel 3' and/or the drive gearwheel 2', and a reduction of drag losses and therefore reliable operation of the wet-running flexible drive mechanism 1 in a manner which is optimized in terms of the degree of efficiency can therefore be ensured.

LIST OF REFERENCE NUMERALS

1 Wet-running flexible drive mechanism
2 Drive element
2' Drive gearwheel
3 Output element
3' Output gearwheel
4 Lubricant sump
5 Guiding element
6 Constriction
7 Rotational direction
8 Exit side
9 Housing
10 Bulge
11 First part
12 Second part
13 Dividing plane
14 Flexible drive
14' Chain
15 Connecting element
16, 16' Longitudinal side
18 First section
19 Second section
20 Angle
21 Geometry of wedge-shaped configuration
22 Highest point
23, 23' Transverse side
24 Side wall
25 Longitudinal axis
26 Rotational axis

The invention claimed is:

1. Wet-running flexible drive mechanism for the transmission of torque having a housing, a drive element, and an output element, the drive element and the output element being drive-connected to one another via a flexible drive, the flexible drive being arranged partially in a lubricant and/or coolant sump, wherein the lubricant and/or coolant sump is integrally formed in the housing, wherein at least one guiding element is arranged in a region of the lubricant sump, the guiding element being shaped in such a way that a constriction in the form of a gap which tapers in a wedge-shaped manner is formed between the flexible drive which is arranged partially in the lubricant sump and the guiding element;
  wherein the guiding element is fixed to the housing,
  wherein the guiding element has a geometry of a wedge-shaped configuration defining a highest point and first and second longitudinal sides on opposite sides of the highest point, and
  wherein a first section of the guiding element, starting from the highest point, runs at a more acute angle in the direction of the first longitudinal side than a second section of the guiding element, starting from the highest point, runs in the direction of the second longitudinal side.

2. Wet-running flexible drive mechanism according to claim 1, wherein the housing has a bulge in the region of the lubricant and/or coolant sump.

3. Wet-running flexible drive mechanism according to claim 2, wherein the guiding element is arranged at the bulge of the housing.

4. Wet-running flexible drive mechanism according to claim 3, wherein the guiding element has a first part and a second part, the first part and the second part being configured such that they can be joined along a dividing plane to form the guiding element.

5. Wet-running flexible drive mechanism according to claim 3, wherein the bulge and the guiding element are configured in one piece.

6. Wet-running flexible drive mechanism according to claim 3, wherein the guiding element is fastened to the bulge by a connecting element.

7. Wet-running flexible drive mechanism according to claim 6, wherein the connecting element is joined to the housing in a positive locking manner.

8. Wet-running flexible drive mechanism according to claim 1, wherein the first and second sections have a concave curvature.

9. Wet-running flexible drive mechanism according to claim 1, wherein the first section is longer than the second section.

10. Wet-running flexible drive mechanism according to claim 1, wherein the highest point of the guiding element is offset toward the second longitudinal side relative to a longitudinal center of the guiding element.

11. Wet-running flexible drive mechanism according to claim 1, wherein the guiding element is arranged at an oblique angle relative to an upper surface of the lubricant sump.

* * * * *